(12) United States Patent
Cook et al.

(10) Patent No.: US 12,709,075 B2
(45) Date of Patent: Aug. 18, 2026

(54) PROCESS FOR MANUFACTURING LIGHTWEIGHT AND DURABLE WINDOW WELL

(71) Applicant: ROCKWELL LLC, Springville, UT (US)

(72) Inventors: Vaughn Allen Cook, Mapleton, UT (US); David Wayne Hoagland, Provo, UT (US); Rodney William Slade, Mapleton, UT (US); Kaleb Vaughn Cook, Mapleton, UT (US)

(73) Assignee: ROCKWELL LLC, Springville, UT (US)

( * ) Notice: Subject to any disclaimer, the term of this patent is extended or adjusted under 35 U.S.C. 154(b) by 485 days.

(21) Appl. No.: 18/204,753

(22) Filed: Jun. 1, 2023

(65) Prior Publication Data

US 2023/0311432 A1 Oct. 5, 2023

Related U.S. Application Data

(60) Division of application No. 16/925,759, filed on Jul. 10, 2020, now Pat. No. 11,697,252, which is a (Continued)

(51) Int. Cl.
*B29C 70/46* (2006.01)
*B29C 70/34* (2006.01)
(Continued)

(52) U.S. Cl.
CPC .......... *B29C 70/462* (2013.01); *B29C 70/345* (2013.01); *E04F 17/06* (2013.01); (Continued)

(58) Field of Classification Search
CPC ........................ B29K 2023/12; B29K 2039/08
See application file for complete search history.

(56) References Cited

U.S. PATENT DOCUMENTS 1,680,032 A 8/1928 Anderson
2,206,862 A 7/1940 Boyd
(Continued)

FOREIGN PATENT DOCUMENTS

CA 100316 S 2/2003

OTHER PUBLICATIONS

Advisory Action (PTOL-303) Mailed on Nov. 25, 2022 for U.S. Appl. No. 17/173,007, 3 page(s).
(Continued)

*Primary Examiner* — Alison L Hindenlang
*Assistant Examiner* — Debjani Roy
(74) *Attorney, Agent, or Firm* — Workman Nydegger

(57) ABSTRACT

A lightweight and durable window well is composed of a long fiber reinforced thermoplastic (LFRT). The lightweight and durable window well has at least some fibers that are omnidirectional relative to the other fibers in the thermoplastic. Additionally, at least some fibers of the LFRT have a length greater than 40 mm. The window well also has a body having a plurality of ribs interposed between a plurality of wall surface portions. Additionally, each rib is positioned between two different wall surface portions and is defined by a variable height and a variable depth. Furthermore, the wall surface portions have a variable thickness that varies from a minimal thickness of less than 3 mm to a maximum thickness of greater than 5 mm, with the wall surface being thicker near the ribs than at portions furthest from the ribs in the wall surface.

15 Claims, 16 Drawing Sheets

Related U.S. Application Data continuation-in-part of application No. 29/713,876, filed on Nov. 19, 2019, now Pat. No. Des. 931,498, and a continuation-in-part of application No. 29/713,875, filed on Nov. 19, 2019, now Pat. No. Des. 931,497.

(60) Provisional application No. 63/013,268, filed on Apr. 21, 2020, provisional application No. 62/979,265, filed on Feb. 20, 2020, provisional application No. 62/979,264, filed on Feb. 20, 2020, provisional application No. 62/874,844, filed on Jul. 16, 2019.

(51) Int. Cl.

| | |
|---|---|
| ***E04F 17/06*** | (2006.01) |
| *B29K 23/00* | (2006.01) |
| *B29K 309/08* | (2006.01) |
| *B29L 31/10* | (2006.01) |

(52) U.S. Cl.

CPC ...... *B29K 2023/12* (2013.01); *B29K 2309/08* (2013.01); *B29L 2031/10* (2013.01)

(56) References Cited

U.S. PATENT DOCUMENTS

| | | | | |
|---|---|---|---|---|
| 3,004,634 | A | 10/1961 | Evans et al. | |
| 3,099,900 | A | 8/1963 | Beck | |
| 3,888,058 | A | 6/1975 | Ahrens | |
| 4,126,719 | A | 11/1978 | Koyanagi et al. | |
| 4,704,828 | A | 11/1987 | Kemp | |
| 4,951,434 | A | 8/1990 | Schmidt | |
| 5,194,462 | A | 3/1993 | Hirasaka et al. | |
| 5,466,317 | A | 11/1995 | Lause et al. | |
| 5,725,940 | A * | 3/1998 | Sakai | B29C 70/865 428/318.6 |
| 5,958,539 | A * | 9/1999 | Eckart | B32B 27/36 428/46 |
| 6,484,455 | B1 | 11/2002 | Poole | |
| D523,966 | S | 6/2006 | Kitchen et al. | |
| 7,171,786 | B2 | 2/2007 | George | |
| D550,859 | S | 9/2007 | Oakley | |
| 7,311,216 | B2 | 12/2007 | Donnelly et al. | |
| D586,477 | S | 2/2009 | Kemp | |
| 7,549,256 | B1 | 6/2009 | Watkins | |
| 7,730,673 | B2 | 6/2010 | George | |
| 8,578,662 | B1 | 11/2013 | Monk | |
| D931,497 | S | 9/2021 | Cook et al. | |
| D931,498 | S | 9/2021 | Cook et al. | |
| 11,697,252 | B2 | 7/2023 | Cook et al. | |
| 2002/0059772 | A1 | 5/2002 | Hagel | |
| 2003/0029103 | A1 | 2/2003 | Wack et al. | |
| 2003/0167705 | A1 | 9/2003 | Oakley | |
| 2004/0098929 | A1 | 5/2004 | Kim et al. | |
| 2005/0115169 | A1 | 6/2005 | George | |
| 2005/0252103 | A1 * | 11/2005 | Cook | E04F 17/06 52/107 |
| 2005/0268564 | A1 | 12/2005 | Theophilus | |
| 2007/0006537 | A1 | 1/2007 | Theophilus | |
| 2007/0130846 | A1 | 6/2007 | George | |
| 2008/0010911 | A1 | 1/2008 | George | |
| 2009/0090160 | A1 | 4/2009 | Kemp | |
| 2010/0205897 | A1 | 8/2010 | George | |
| 2011/0052910 | A1 | 3/2011 | Gunnink et al. | |
| 2011/0232206 | A1 | 9/2011 | George | |
| 2011/0262701 | A1 | 10/2011 | Albertelli | |
| 2014/0134422 | A1 | 5/2014 | Kraatz et al. | |
| 2015/0113897 | A1 | 4/2015 | Behr et al. | |
| 2019/0047676 | A1 | 2/2019 | Behzadpour et al. | |
| 2021/0017772 | A1 | 1/2021 | Cook et al. | |
| 2021/0164240 | A1 | 6/2021 | Cook et al. | |
| 2021/0172180 | A1 | 6/2021 | Cook et al. | |
| 2021/0207387 | A1 | 7/2021 | Cook et al. | |
| 2025/0237069 | A1 | 7/2025 | Cook et al. | |

OTHER PUBLICATIONS

Advisory Action received for U.S. Appl. No. 16/925,759, mailed on Nov. 25, 2022, 3 pages.

Advisory Action received for U.S. Appl. No. 17/173,007, mailed on Nov. 25, 2022, 3 pages.

Advisory Action received for U.S. Appl. No. 17/203,377, mailed on Mar. 8, 2023, 3 pages.

CA Office Action Mailed on Jul. 19, 2021 for CA Application No. 193940.

CA Office Action Mailed on Jul. 19, 2021 for CA Application No. 193941.

Egress Window Well Photo Gallery Rockwell Window Wells https://rockwellinc.com/basement-egress-window-wells-gallery/image-gallery Feb. 2020 (Year: 2020).

Examiner Interview Summary Record (PTOL-413) Mailed on Aug. 17, 2021 for U.S. Appl. No. 29/713,875.

Examiner Interview Summary Record (PTOL-413) Mailed on Oct. 11, 2022 for U.S. Appl. No. 17/173,007.

Final Office Action received for U.S. Appl. No. 16/925,759, mailed on Aug. 29, 2022, 19 pages.

Final Office Action received for U.S. Appl. No. 17/173,007, mailed on Apr. 6, 2023, 11 pages.

Final Office Action received for U.S. Appl. No. 17/173,007, mailed on Aug. 30, 2022, 22 pages.

Final Office Action received for U.S. Appl. No. 17/173,010, mailed on Oct. 25, 2022, 23 pages.

Final Office Action received for U.S. Appl. No. 17/203,377, mailed on Nov. 23, 2022, 18 pages.

Final Rejection Mailed on Aug. 30, 2022 for U.S. Appl. No. 17/173,007, 22 page(s).

Final Rejection Mailed on Nov. 23, 2022 for U.S. Appl. No. 17/203,377, 17 page(s).

Final Rejection Mailed on Oct. 25, 2022 for U.S. Appl. No. 17/173,010, 22 page(s).

Non-Final Office Action received for U.S. Appl. No. 16/925,759, mailed on Feb. 1, 2023, 7 pages.

Non-Final Office Action received for U.S. Appl. No. 16/925,759, mailed on Mar. 2, 2022, 15 pages.

Non-Final Office Action received for U.S. Appl. No. 17/173,007, mailed on Apr. 21, 2022, 18 pages.

Non-Final Office Action received for U.S. Appl. No. 17/173,007, mailed on Feb. 9, 2023, 11 pages.

Non-Final Office Action received for U.S. Appl. No. 17/173,010, mailed on Apr. 12, 2023, 8 pages.

Non-Final Office Action received for U.S. Appl. No. 17/173,010, mailed on Apr. 22, 2022, 17 pages.

Non-Final Office Action received for U.S. Appl. No. 17/203,377, mailed on Jun. 7, 2022, 17 pages.

Non-Final Rejection Mailed on Apr. 21, 2022 for U.S. Appl. No. 17/173,007, 17 page(s).

Non-Final Rejection Mailed on Apr. 22, 2022 for U.S. Appl. No. 17/173,010, 16 page(s).

Non-Final Rejection Mailed on Jun. 7, 2022 for U.S. Appl. No. 17/203,377, 17 page(s).

Non-Final Rejection Mailed on Mar. 3, 2021 for U.S. Appl. No. 29/713,875.

Non-Final Rejection Mailed on Mar. 3, 2021 for U.S. Appl. No. 29/713,876.

Notice of Allowance and Fees Due (PTOL-85) Mailed on Aug. 13, 2021 for U.S. Appl. No. 29/713,875, 7 page(s).

Notice of Allowance and Fees Due (PTOL-85) Mailed on Aug. 13, 2021 for U.S. Appl. No. 29/713,876, 7 page(s).

Notice of Allowance and Fees Due (PTOL-85) Mailed on Jul. 24, 2023 for U.S. Appl. No. 17/173,007, 8 page(s).

Notice of Allowance and Fees Due (PTOL-85) Mailed on Jul. 26, 2023 for U.S. Appl. No. 17/173,010, 9 page(s).

Notice of Allowance and Fees Due (PTOL-85) Mailed on Mar. 30, 2023 for U.S. Appl. No. 17/203,377, 8 page(s).

Notice of Allowance received for U.S. Appl. No. 16/925,759, mailed on Mar. 15, 2023, 8 pages.

Notice of Allowance received for U.S. Appl. No. 17/203,377, mailed on Mar. 30, 2023, 8 pages.

(56) References Cited

OTHER PUBLICATIONS

Notice of Allowance received for U.S. Appl. No. 29/713,875, mailed on Aug. 13, 2021, 7 pages.
Notice of Allowance received for U.S. Appl. No. 29/713,876, mailed on Aug. 13, 2021, 7 pages.
Requirement for Restriction/Election Mailed on Dec. 2, 2021 for U.S. Appl. No. 17/173,007, 8 page(s).
Requirement for Restriction/Election Mailed on Dec. 2, 2021 for U.S. Appl. No. 17/173,010, 8 page(s).
Restriction Requirement received for U.S. Appl. No. 16/925,759, mailed on Dec. 1, 2021, 8 pages.
Restriction Requirement received for U.S. Appl. No. 17/173,007, mailed on Dec. 2, 2021, 8 pages.
Restriction Requirement received for U.S. Appl. No. 17/173,010, mailed on Dec. 2, 2021, 8 pages.
Rockwell Denali https://rockwellinc.com/denali Jan. 2020 (Year: 2020).
Boman Kemp Area Well Extension Installation Instructions, https://www.youtube.com/watch?v=O1SYvxcDo6Q, Jun. 26, 2024.
Final Office Action received for U.S. Appl. No. 18/516,644, mailed on Jan. 14, 2026, 7 pages.
Non-Final Office Action received for U.S. Appl. No. 18/516,687, mailed on Dec. 4, 2025, 17 pages.
Non-Final Office Action received for U.S. Appl. No. 18/516,644, mailed on Sep. 24, 2025, 7 pages.
Requirement for Restriction/Election received for U.S. Appl. No. 18/516,687, mailed on Sep. 11, 2025, 6 pages.

* cited by examiner

400

1800

PROCESS FOR MANUFACTURING LIGHTWEIGHT AND DURABLE WINDOW WELL

CROSS-REFERENCE TO RELATED APPLICATIONS

This application is a divisional under 35 USC 121 of U.S. patent application Ser. No. 16/925,759 filed on Jul. 10, 2020, entitled "LIGHTWEIGHT AND DURABLE WINDOW WELL," which claims the benefit of and priority to U.S. Provisional Patent Application Ser. No. 62/874,844 filed on Jul. 16, 2019, entitled "LIGHTWEIGHT AND DURABLE WINDOW WELL," U.S. Provisional Patent Application Ser. No. 62/979,264 filed on Feb. 20, 2020, entitled "MODULAR INSERT FOR A WINDOW WELL," U.S. Provisional Patent Application Ser. No. 62/979,265 filed on Feb. 20, 2020, entitled "VEIL PRINTING PROCESSES FOR MOLDING THERMOPLASTIC WINDOW WELLS," U.S. Provisional Application Ser. No. 63/013,268 filed on Apr. 21, 2020, entitled "MODULAR STEP FOR A WINDOW WELL," United States Non-Provisional Design patent application Ser. No. 29/713,875 filed on Nov. 19, 2019, entitled "WINDOW WELL," and United States Non-Provisional Design patent application Ser. No. 29/713,876 filed on Nov. 19, 2019, entitled "WINDOW WELL EXTENSION," all of which are incorporated herein by reference in their entireties.

BACKGROUND

Technical Field

This disclosure generally relates to window wells. More specifically, the present disclosure relates to lightweight and durable window wells.

Related Technology

A window well is one type of a building component that can be used to hold back dirt and other material from a window that is below ground level. A typical window well is embodied as a U-shaped wall formed out of metal. One purpose of a window well is to let natural light into basement windows, while also providing an access point for entry/escape, should it be necessary. Window wells are often attached directly to a building structure and are visible from both the inside and outside of the building structure. Additionally, window wells must be strong enough to hold back and retain backfill soils without deflecting.

Many window wells are made of steel or a similar metal, which makes them relatively heavy and difficult/expensive to transport. Additionally, metal window wells can be easily damaged during transportation and installation. Even after installation, a metal window well can be damaged. For instance, a window well can be impacted by other devices after the window well has been installed. When a damaged window well needs to be replaced, it can be an expensive and time intensive process to excavate and replace an installed window well.

Additionally, since the window wells are exposed to the elements, they can become corroded and rust (depending on their material composition). Even when not corroded, metal window wells can be somewhat unattractive. Furthermore, it is difficult to make a metal window well look like a natural material or be aesthetically pleasing.

Some window wells are manufactured out of plastic materials, which makes them easier to apply an aesthetic texture to. However, the improved aesthetics often come at a cost of sacrificing durability and strength. In particular, existing window wells manufactured out of current plastic materials are typically not strong enough to compete with metal window wells because the types of plastic that are suitable for injection molding or rotomolding (the typical processes used for manufacturing plastic window wells), for example, cannot be used to manufacture a layered or reinforced plastic material.

Accordingly, there is a need for a window well that is durable, lightweight and visually attractive. Additionally, there is a need for improving techniques for repairing and replacing window wells.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments relate to lightweight and durable window wells composed of long fiber reinforced thermoplastic.

In some embodiments, the window well has at least some fibers that are omnidirectional relative to the other fibers in the thermoplastic. Additionally, at least some fibers of the long fiber reinforced thermoplastic have a length greater than 40 mm. In some embodiments, at least some of the fibers of the long fiber reinforced thermoplastic have a length greater than 60 mm. Additionally, in some embodiments, at least some of the fibers of the long fiber reinforced thermoplastic have a length of greater than 100 mm. Furthermore, in some embodiments, the window well is composed of long fiber reinforced polypropylene that is reinforced with glass fibers.

In some embodiments, the window well is composed of fiber reinforced thermoplastic and has a body having a plurality of ribs interposed between a plurality of wall surface portions. Additionally, each rib is positioned between two different wall surface portions and is defined by a variable height and a variable depth. Furthermore, in some embodiments, the wall surface portions have a variable thickness that varies from a minimal thickness of less than 3 mm to a maximum thickness of greater than 5 mm. It should also be noted that in some embodiments the wall surface portions are thickest near the ribs.

Additionally, at least some embodiments herein relate to a method for manufacturing a window well. The method includes (1) heating a fiber reinforced thermoplastic sheet to more than 250° F.; (2) positioning the fiber reinforced thermoplastic sheet, after the heating, within the mold; and (3) compressing the fiber reinforced thermoplastic sheet within the mold with a pressure of greater than 200 psi. However, in some embodiments, the thermoplastic sheet is heated to more than 385° F. either prior to or during the compression. Additionally, in some embodiments, the reinforced thermoplastic sheet within the mold is compressed with a pressure within the range of 300 psi and 400 psi. The mold is sized and shaped to produce a window well that has a varying wall thickness.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail using the accompanying drawings in which.

DETAILED DESCRIPTION

Figure 1:
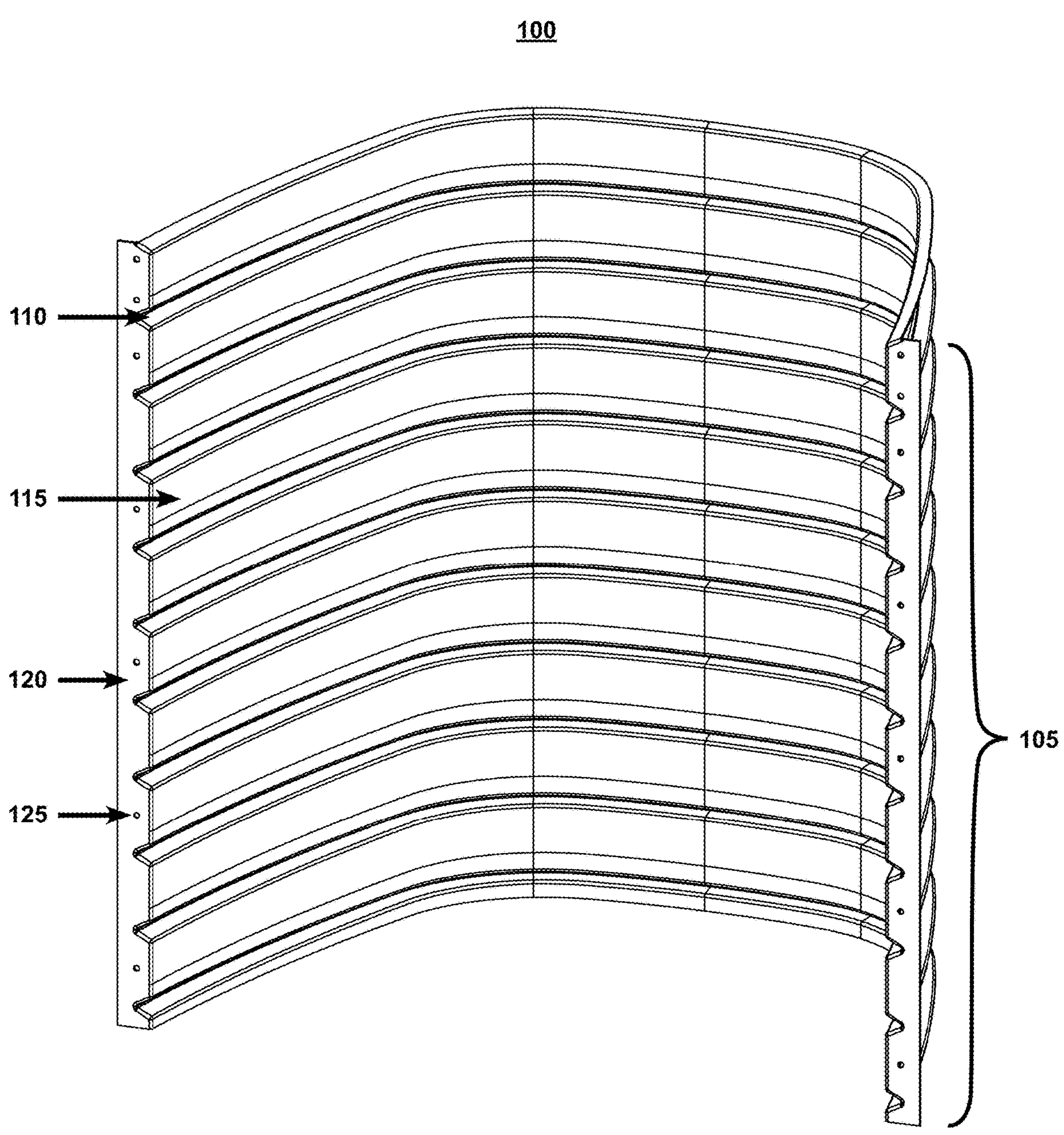
FIG. 1 illustrates a perspective view of an exemplary lightweight and durable window well.

Before describing various embodiments of the present disclosure in detail, it is to be understood that this disclosure is not limited to the parameters of the particularly exemplified systems, methods, apparatus, products, processes and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

Overview of the Lightweight and Durable Window Well

Embodiments disclosed herein relate to window wells manufactured out of long fiber reinforced thermoplastic materials, as well as devices, systems and processes for manufacturing window wells composed of long fiber reinforced thermoplastic materials. The window well is also specially designed to improve functionality and aesthetics.

In some embodiments, the window well has a generally U-shaped body comprising of a plurality of ribs and wall surfaces. Each one of the ribs is interposed between two different wall surface portions. It should be noted that the ribs increase the rigidity of the window well while keeping the weight of the window well low. Additionally, the window well has substantially planar flanges that are used to securely attach the window well to a structure.

In some embodiments, the window well is composed out of a thermoplastic material that is reinforce with glass fibers. The glass fibers are oriented in random directions (e.g., random directional or omnidirectional relative to other fibers in the material). Additionally, some of the glass fibers have a length greater than 40 mm. Furthermore, in some embodiments, some of the glass fibers have a length greater than 60 mm or greater than 100 mm.

In some embodiments, the window well has a varying wall thickness. More particularly, the wall thickness increases in the support structures of the window well. In other words, the ribs, which resist most of the torsion forces caused by the backfill soil, are thicker than the wall surface portions that are interposed (physically positioned) between the ribs of the window well. The varying wall thickness also allows material to be removed from areas of the window well which experience less torsion, bending and/or shear forces.

Technical Benefits and Advantages

The disclosed embodiments can be used to solve many of the problems caused by traditional window wells. In particular, the disclosed embodiments are directed to window wells composed of long fiber reinforced thermoplastic (LFRT). Manufacturing the window wells out of LFRT improves the strength and durability of the window wells as compared to window wells made of metal or other plastics. Furthermore, the LFRT allows the window wells to be more lightweight than traditional window wells.

Because of the improved strength and durability of the LFRT, the disclosed window wells are less likely to be damaged during delivery and installation. The window wells are also less likely to be damaged after installation because the reinforced thermoplastic is more resistant to impacts and general degradation.

When repairs are necessary, the disclosed embodiments allow a user to repair the window well without having to detach the entire window well from the corresponding structure (i.e., the structure that the window well is attached to). For example, in some instances, the disclosed embodiments allow a user to remove the damage portion of a window well and replace the removed portion with a modular insert (i.e., a shorter window well). Therefore, a user will not need to excavate and remove the window well when small to moderate repairs are necessary.

The disclosed embodiments also reduce transportation and shipping costs. More particularly, the window wells are designed to be stackable. In other words, the window wells fit partially inside one another. Therefore, a user can store and transport the lightweight and durable window wells more efficiently than traditional window wells.

Additionally, the disclosed embodiments improve the visual aesthetics of the window well. For example, the LFRT window wells are available in a wide variety of colors and textures. Therefore, property owners can choose a color and texture that compliments their structure's color scheme or blends well with the structure's landscape.

Furthermore, a fabric veil can be used during the manufacturing process that significantly adds to the overall realism of surface texturing (e.g., by adding a variety of colors to the surface of the window well). Therefore, instead of detracting from the beauty of a structure, the window well can improve the visual aesthetics of the structure.

Overall, the lightweight and durable window well has a variety of improvements over a traditional window well.

The Lightweight and Durable Window Well

FIG. 1 illustrates a perspective view of one embodiment of a lightweight and durable window well 100. In FIG. 1, the body 105 of the window well 100 is a generally U-shaped wall. However, some embodiments have a body that is generally box or V shape. Furthermore, it should be noted that the body can be a wall of any shape that retains backfill soil (e.g., square, rectangular or circular/curve shaped).

In the embodiment shown in FIG. 1, the body 105 of the window well has ten grooves 110 and eleven wall surface portions 115. However, other embodiments include more or less grooves and wall surface portions. Further details on these grooves 110 and surface portions 115 will be provided later.

The lightweight and durable window well 100 also has substantially planar flanges 120 on each side. The flanges 120 are the portions of the window well which contact the structure and are disposed on distal or terminal ends of the window well 100. The planar flanges 120 have attachment holes 125 which facilitate installation of the lightweight and durable window well 100 (i.e., facilitate attaching the window well 100 to a structure).

The attachment holes 125 allow the lightweight and durable window well 100 to be fastened to a structure using a screw or a bolt. The attachment holes can be placed every 1 cm, 2 cm, 3 cm, 4 cm, 5 cm, 6 cm, 7 cm, 8 cm, 9 cm, 10 cm, 15 cm, 20 cm, 30 cm or more than 30 cm according to needs or preferences. Additionally, the size and shape of the holes can vary to allow for a variety of fasteners. It should be noted that some embodiments do not include attachment holes. In embodiments without attachment holes, a user can add custom holes during the installation (e.g., by using a drill).

The attachment holes 125 also help in the transportation of the lightweight and durable window well 100. For example, the attachment holes 125 can be used to align, stack or secure the window wells while the window wells are being transported. Additionally, more material/thickness can be positioned at the flanges 120 to increase the strength of the flanges 120, while also reducing the amount of material in the rest of the window well, thereby reducing the overall weight of the window well.

Figure 2:
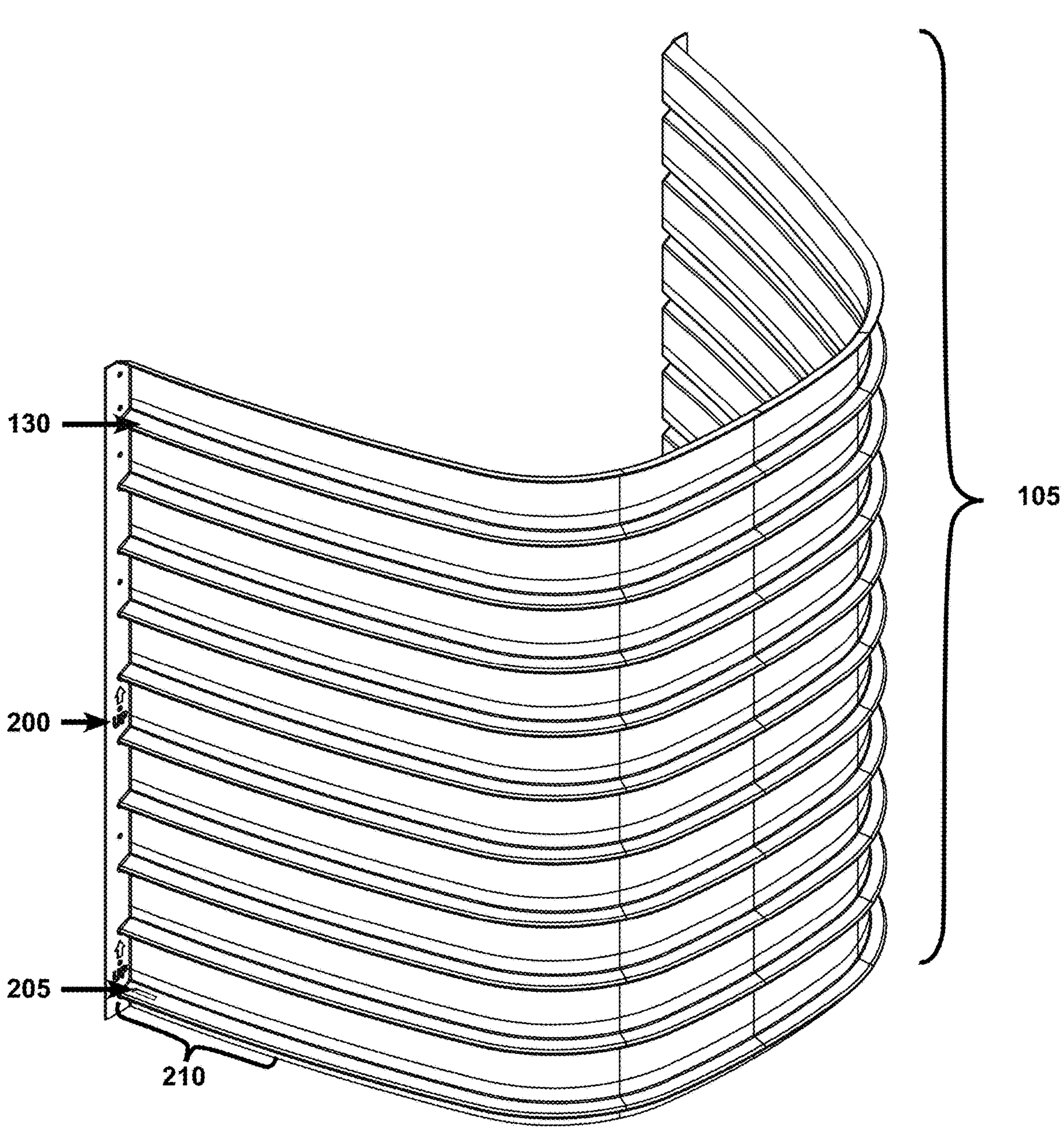
FIG. 2 illustrates a perspective view of the back of the window well of FIG. 1.

FIG. 2 illustrates a perspective view from the back of the lightweight and durable window well 100. In FIG. 2, ten ribs 130 are shown. It should be noted that the ribs 130 increase the stiffness and strength of the window well. Additionally, each one of these ribs 130 has a corresponding groove 110. In other words, the ribs 130 and grooves 110 are opposite sides of the same features (i.e., the groove describe the front/inside surface while the rib describes the back/outside surface of the same feature). Additionally, more details on these ribs 130 will be provided later.

The lightweight and durable window well 100 is also configured, in some embodiments, with one or more four directional indicators 200. The directional indicators 200 facilitate proper placement during installation by helping a user correctly orient the window well 100. The indicators 200 also facilitate proper orientation during storage and shipping. For example, in some embodiments, the window wells can be stored more compactly if all the window wells in storage have the same orientation.

The directional indicators 200 can be formed into the surface of the window well 100 (i.e., the indicators 200 can be molded directly into the window well 100). However, in some embodiments, the directional indicators are formed into the window well 100 after the molding process (e.g., through etching or stamping). In yet other embodiments, the directional indicators can be printed on the window well.

In FIG. 2, the directional indicators 200 comprise of a directional arrow and the word "UP." In some embodiments, the directional indicators only consist of either an arrow or a word (e.g., the word "TOP" on the top portion of the window well). In some embodiments, the window well only has one directional indicator. However, in other embodiments the window well has two or more indicators. Additionally, the directional indicators can be placed on the front and/or back of the window well.

Figure 3:
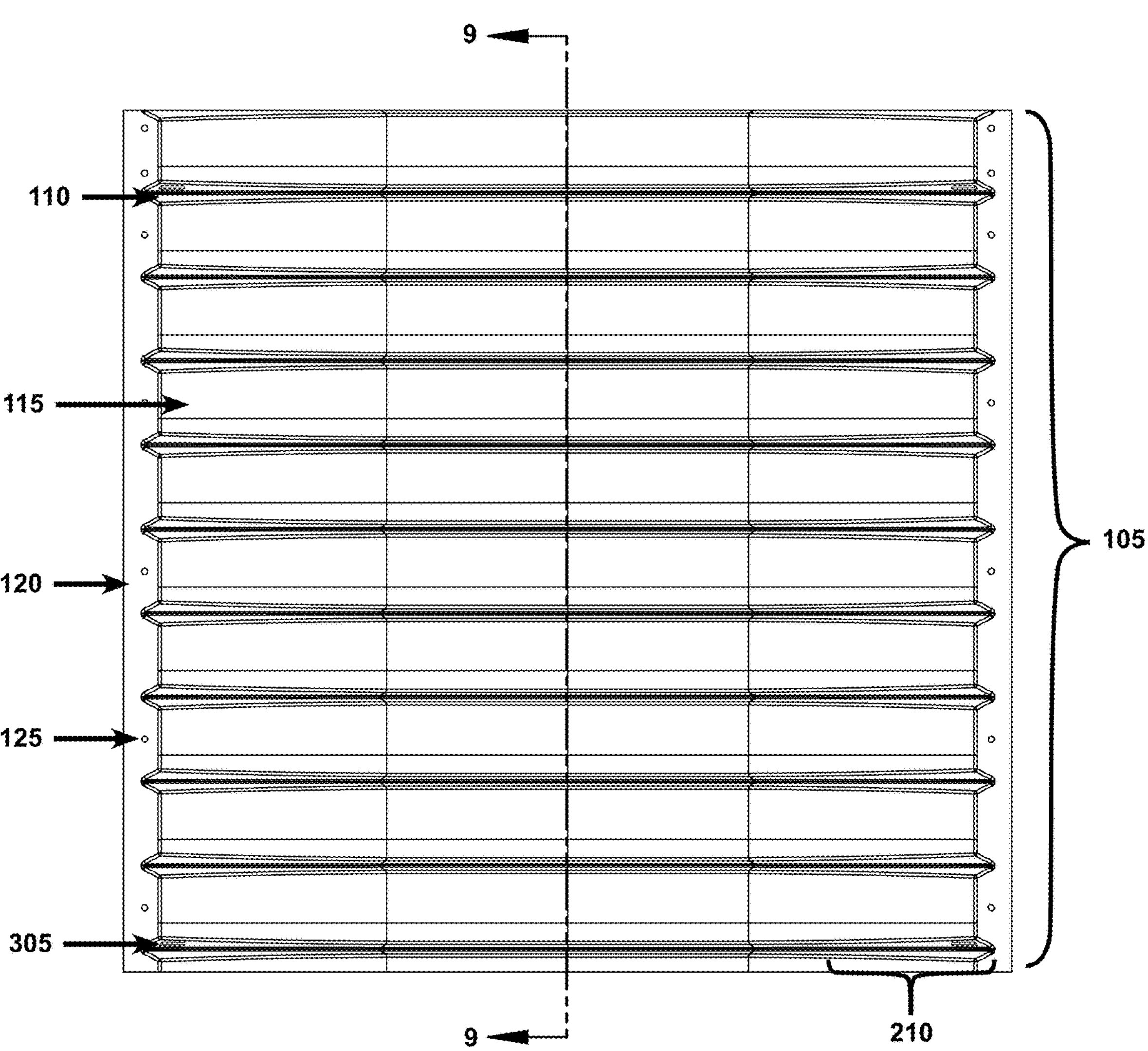
FIG. 3 illustrates a front view of the window well of FIG. 1.
Figure 4:
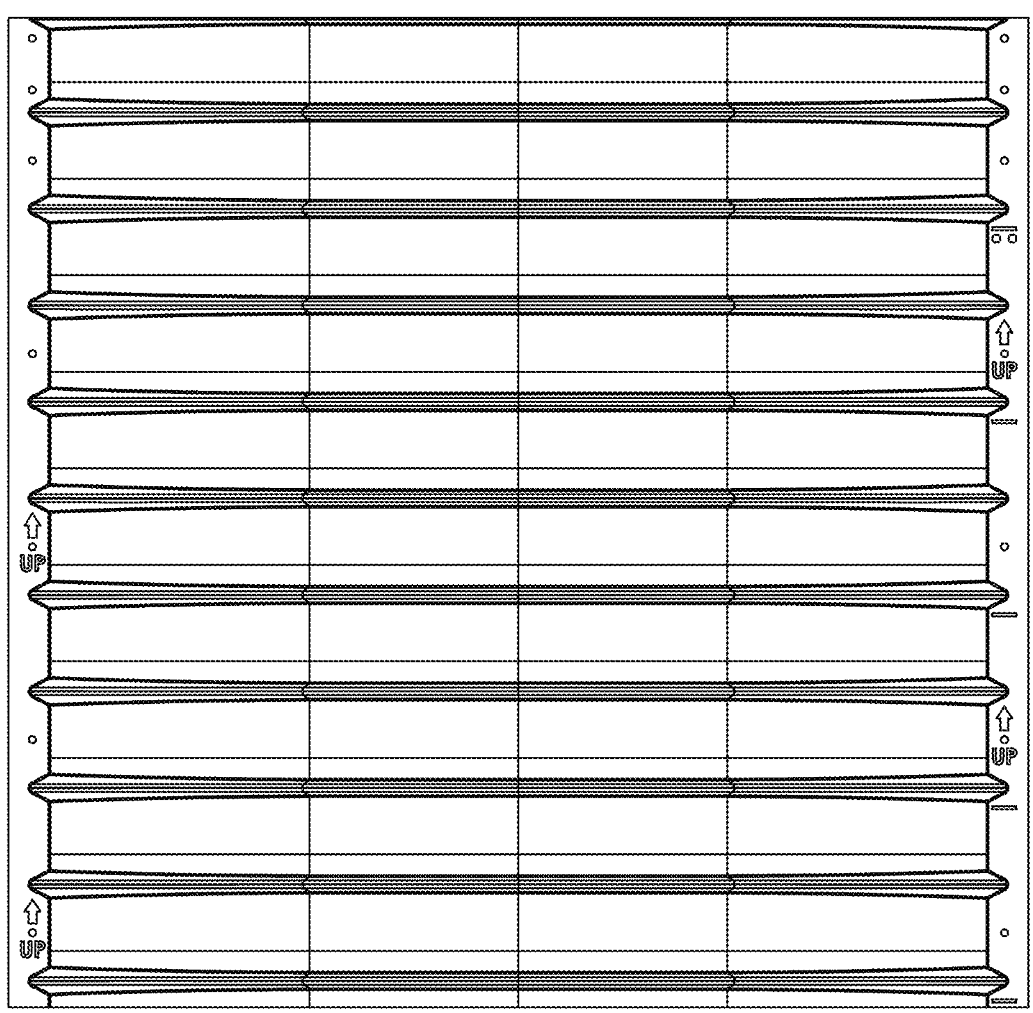
FIG. 4 illustrates a back view of an exemplary lightweight and durable window well.
Figure 5:
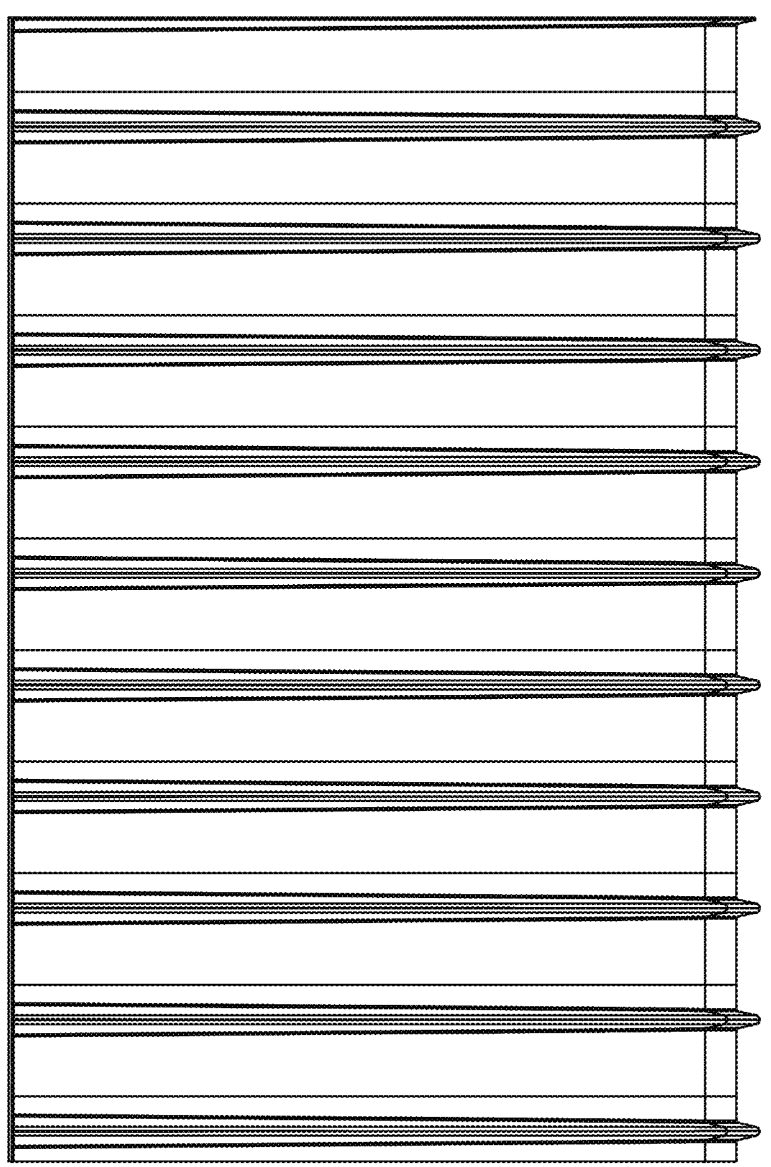
FIG. 5 illustrates a right side view of the window well of FIG. 4
Figure 6:
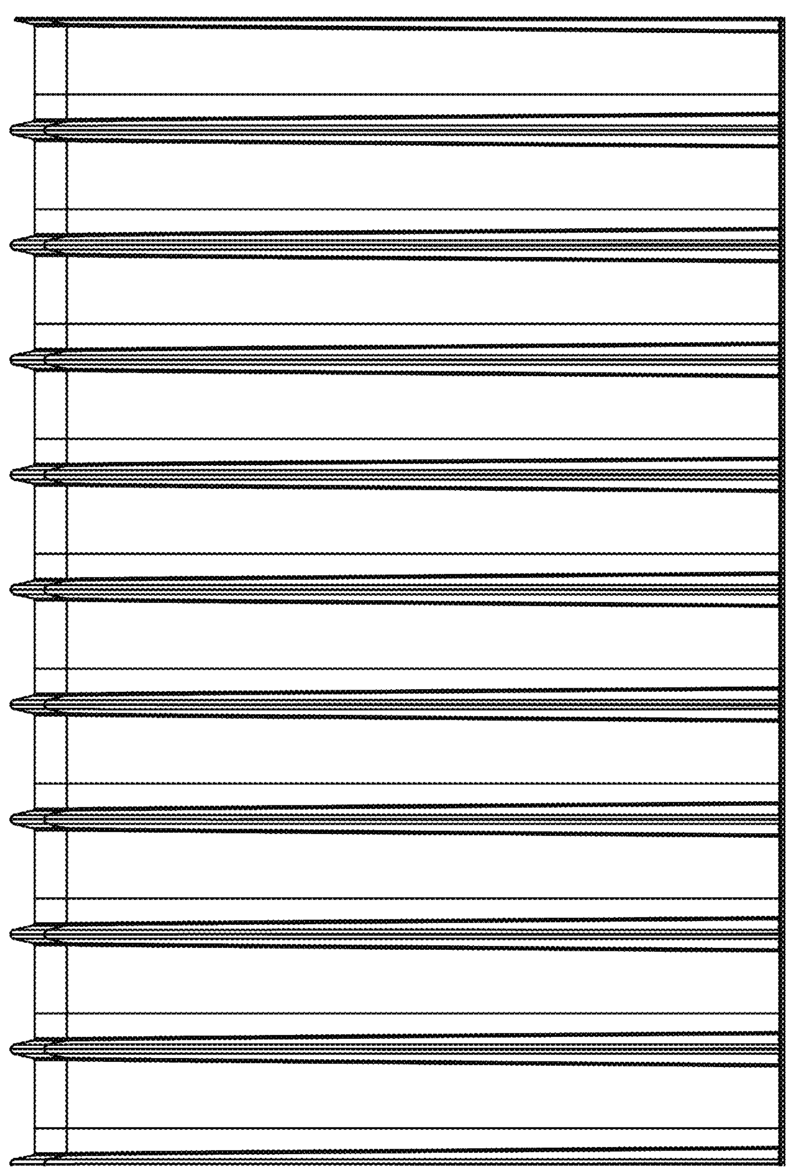
FIG. 6 illustrates a left side view of the window well of FIG. 4.
Figure 7:
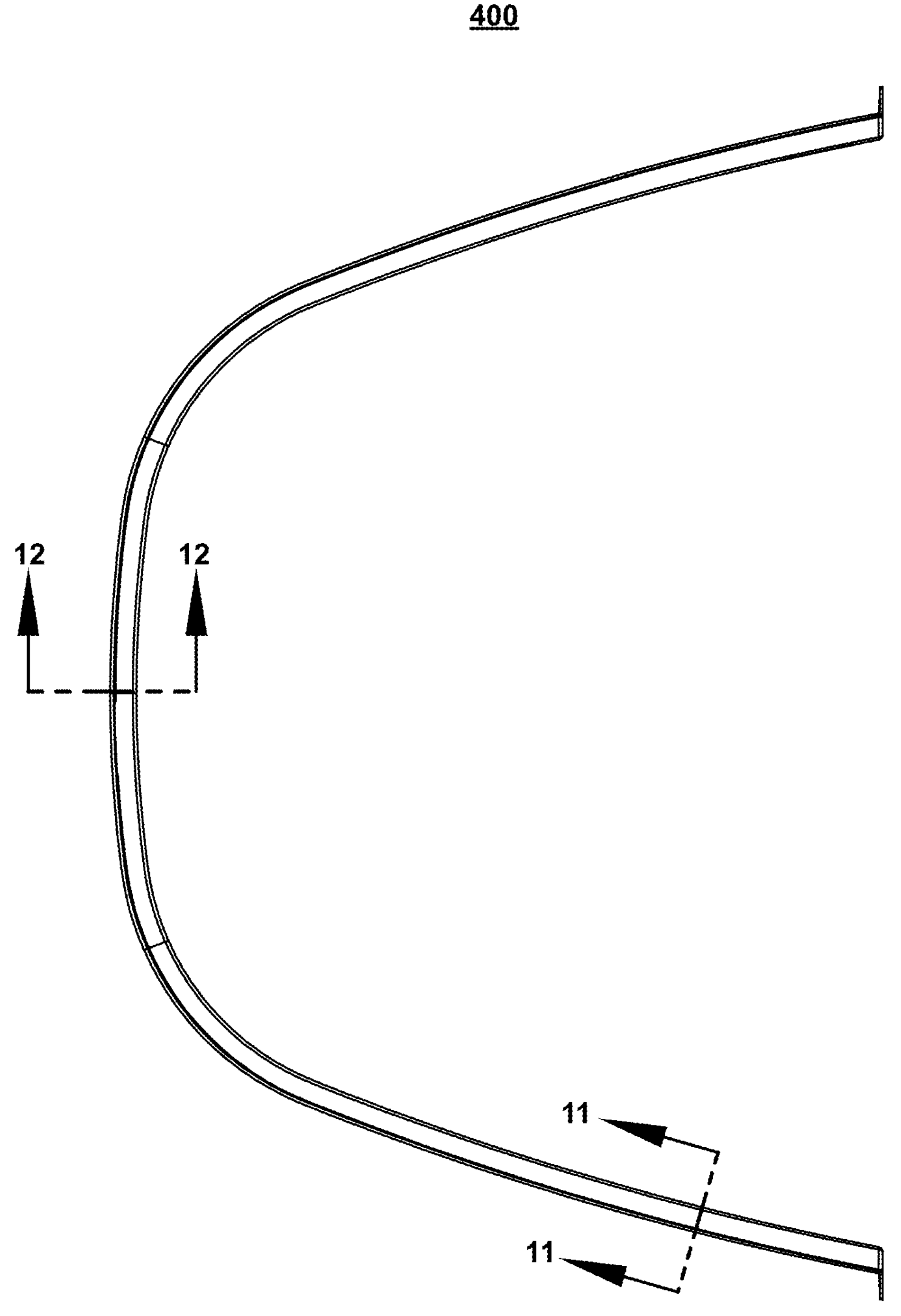
FIG. 7 illustrates a top view of the window well of FIG. 4.
Figure 8:
FIG. 8 illustrates a bottom view of the window well of FIG. 4.
Figure 8:
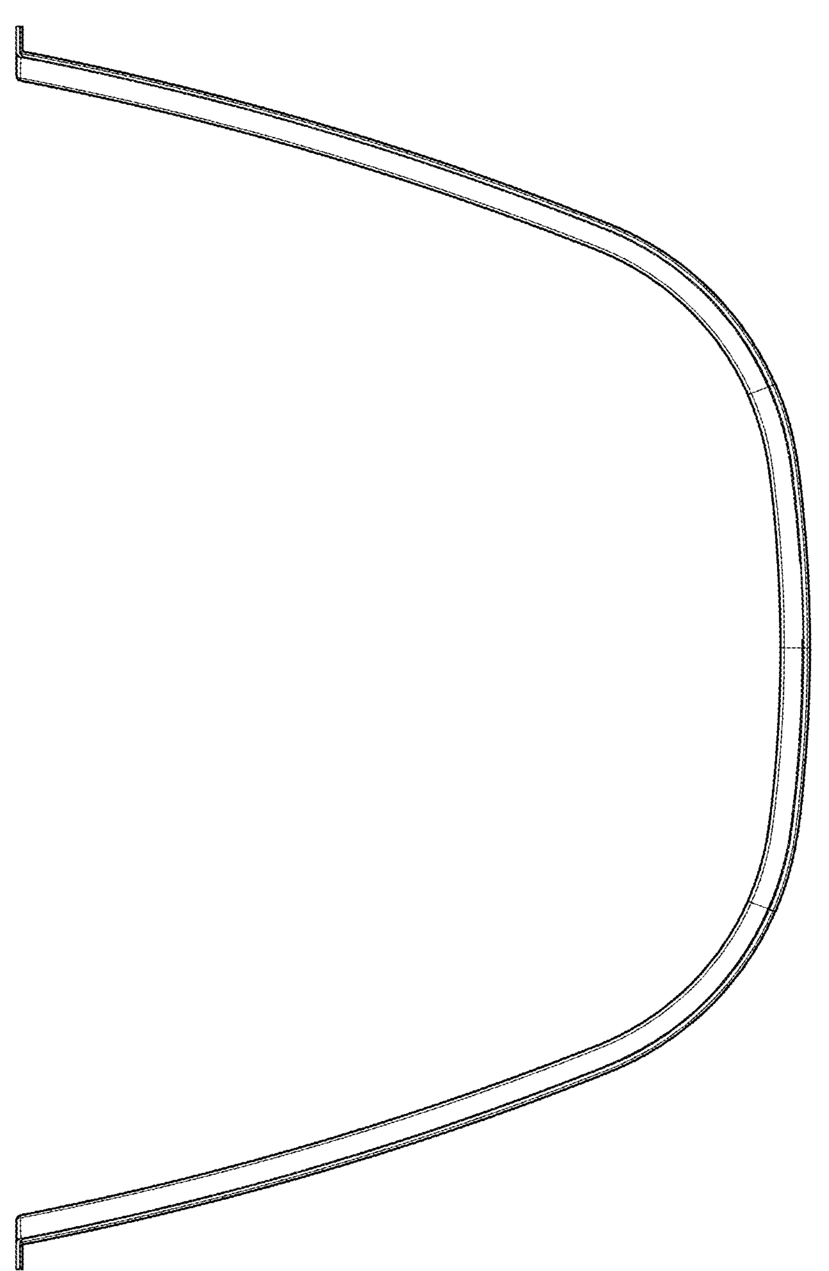

FIG. 3 illustrates a front view of the lightweight and durable window well 100. The lightweight and durable window well 100 has two tabs 305 and two slots 205 on the bottom groove 110 and rib 130, respectively. However, in some embodiments, the window well has tabs on multiple grooves and slots on multiple ribs. Additionally, some embodiments have tabs on every groove and slots on every rib. It should also be noted that some embodiments have more than two slots and tabs per groove/rib. Additionally, some embodiments, have no tabs and/or slots (e.g., window well 400). More details on these tabs and slots will be provided later.

FIGS. 4 through 8 illustrate multiple views of a lightweight and durable window well 400. The height of the body 105 of the window well 100 may vary to accommodate different needs and preferences, from 30 cm to 35 cm, 40 cm, 50 cm, 100 cm, 150 cm, 200 cm or more than 200 cm. Likewise, the width (i.e., the distance between the two opposite planar flanges) and the depth (i.e., the distance from the front of the planar flanges to the furthest point on the back of the ribbing) of the body 105 of the window well 100 may vary to accommodate different needs and preferences, from 0.25 m to 1 m, 2 m, 3 m or more than 3 m.

Additionally, the lightweight and durable window well 100 can be formed of different materials, such as a thermoplastic composite. It should be noted that the embodiment in FIGS. 1 through 8 is made of long fiberglass reinforced polypropylene.

However, some window wells within the scope of the present invention are made of a different thermoplastic composite. For example, some embodiments use long fiber reinforced thermoplastic (LFRT) (e.g., fiberglass reinforced polypropylene, reinforced nylon, rigid thermoplastic polyurethane, polybutylene terephthalate, polyetherimide, polyphthalamide, or some other reinforced thermoplastic). Additionally, some embodiments are manufactured from a glass mat thermoplastic or a continuous fiber reinforced thermoplastic. Furthermore, it should be noted that other fiber reinforced plastics may be used if the material is suitable for high pressure thermoforming such as, but not limited to, sheet molding compounds, bulk molding compounds and other high-performance thermoset composites.

In some embodiments, the thermoplastic is reinforced using fibers, such as glass fibers, carbon fibers or natural fibers (e.g., hemp, flax, ramie). These fibers may have variable lengths, but preferably include at least some relatively long fibers having lengths of greater than the length that is generally suitable/desired for injection molding plastics (e.g., 6 mm to 10 mm). In some instances, the fiber lengths of at least some fibers in the window well are greater than 12.5 mm and, in some instances, greater than 25 mm. In some embodiments, the average length of the fibers ranges from 25 mm to 45 mm. In other embodiments, the average length of the fibers ranges from 45 mm to 80 mm. In yet other embodiments, the average length of the fibers ranges from 80 mm to 120 mm. Additionally, some embodiments have continuous fibers having lengths of many millimeters (e.g., greater than 150 mm).

In some embodiments, the fibers are oriented in random directions (e.g., random directional or omnidirectional relative to other fibers in the material). In other embodiments, the fibers are positioned substantially unidirectionally. Notably, the directionality of the fibers is specifically descriptive with reference to the orientation of a fiber with relationship to other fibers within the material as contained within the relatively flat portions of the molded material (e.g., not the curved or angular portions of the molded material where even unidirectionally positioned fibers will have alignments that are not parallel with other fibers in the flat portions (i.e., the wall surface portions) of the molded material).

In many instances, the reinforced thermoplastic is lighter and more durable to environmental conditions than traditional window well materials, such as metal and other plastics. For example, the reinforced thermoplastic material is more UV resistant and rust/corrosion resistant than traditional materials used to manufacture window wells. The reinforced thermoplastic material also performs well at low temperatures and has increased heat resistance.

Furthermore, the reinforced thermoplastic is more impact resistant than traditional window well materials. In other words, the disclosed embodiments can experience more torsion, bending and impact forces without deforming or cracking, as compared to traditional window wells. Overall, because of the high-quality and strength of the reinforced thermoplastic material, the lightweight and durable window well 100 has a longer lifespan than traditional window wells.

Figure 9:
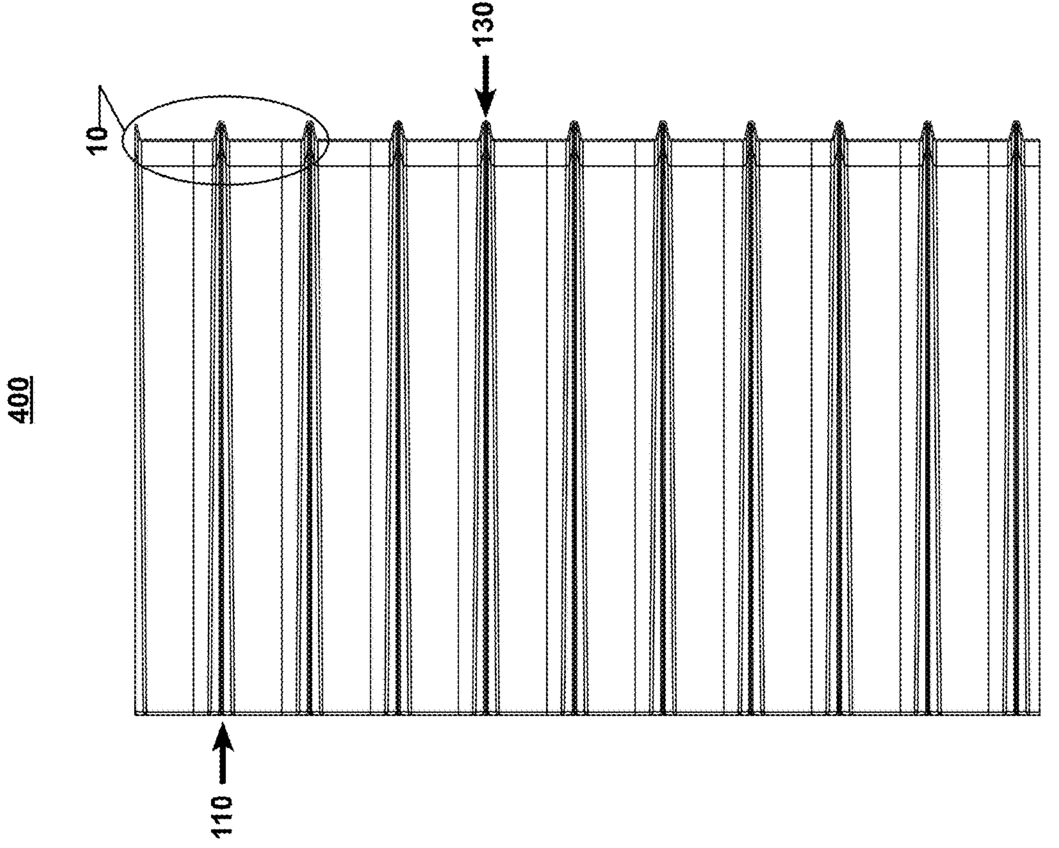
FIG. 9 illustrates a cross-section view of the window well of FIG. 4.

The design of disclosed embodiments also adds strength and durability to the lightweight and durable window well 100. For example, the ribs 130 significantly increase the stiffness of the lightweight and durable window well 100. FIG. 9 is a cross-section side view of the window well 100 which illustrates a cross-section of these ribs 130.

FIG. 9 also illustrates a cross-section of the grooves 110. As discussed above, the grooves 110 define the general shape of the ribs 130 of the window well 100. It should also be noted that the grooves 110 and ribs 130 improve the visual aesthetics of the window well 100. While the current embodiment shows ten ribs 130, it will be appreciated that the window well 100 can include more or fewer than ten ribs.

The spacing between the grooves/ribs 110, 130 can also vary to accommodate different needs and preferences (e.g., 5-10 cm), or less (e.g., 4-6 cm or less) or more (e.g., 10-12 cm or more). In some embodiments, the distance between the grooves/ribs is different within the same window well. For example, one distance between the grooves/ribs is 5 cm, while the next distance between the grooves/ribs is 15 cm.

Additionally, as discussed above, the body of the window well 100 includes a plurality of wall surface portions which surround each groove 110. However, in some embodiments, there is only one wall surface portion (i.e., there are no grooves). The wall surface portion may vary in height to accommodate different needs and preferences, from 10 cm, 20 cm, 30 cm, 40 cm, 50 cm, 60 cm or more than 60 cm. Additionally, in some embodiments the wall surface portions follow the curvature of the body of the window well. However, the depth of the wall surface portion may vary to accommodate different needs and preferences, from 10 cm, 25 cm, 50 cm, 75 cm, 100 cm or more than 100 cm.

Figure 10:
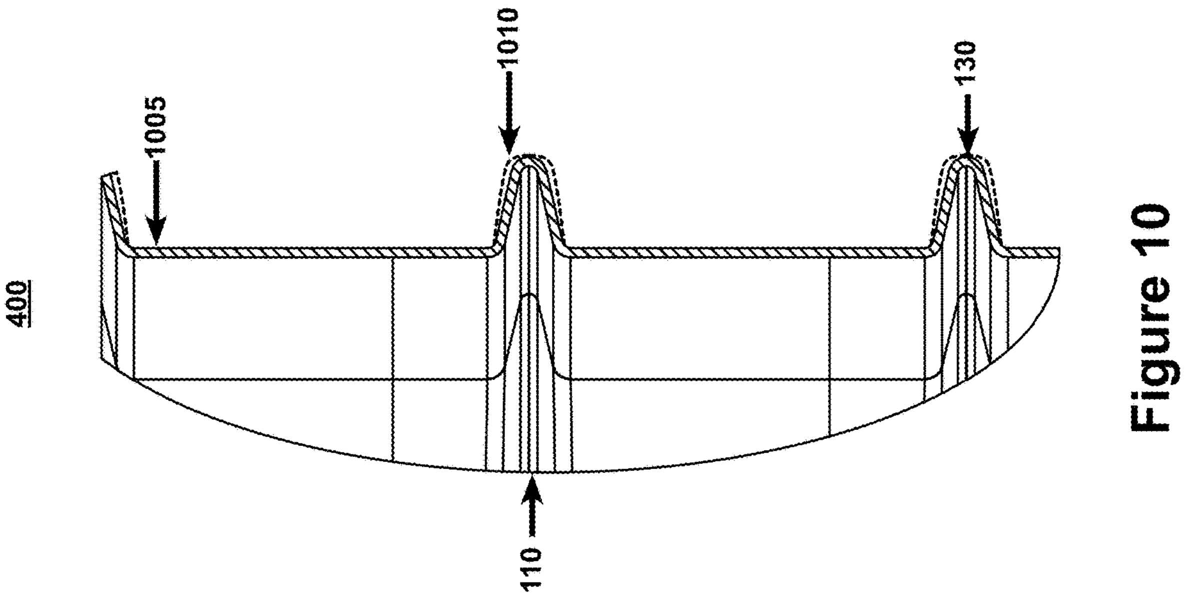
FIG. 10 illustrates a close-up of the cross-section of the grooves and ribs of the window well of FIG. 4. Additionally, the dotted lines of FIG. 10 illustrate an alternate embodiment of the window well (i.e., a window well with varying wall thickness).

FIG. 10 includes a close-up view of the grooves 110 and the ribs 130. It should be noted that the height of the groove 110 is defined by a greatest open latitudinal space within the groove 110 at any corresponding point in the groove 110 (i.e., the distance between the top of the groove and the bottom of the groove at the front surface of the window well). Similarly, the depth of the groove 110 is defined by a greatest longitudinal distance in the groove 110, as measured from a flat surface of the window well to the most interior portion of the groove 110.

In some embodiments, the wall thickness varies. For example, FIG. 10 illustrates both a wall with a constant thickness 1005 and, in dashed lines, a wall with varying thickness 1010. In some instances, the wall thickness varies from 3-4 mm (furthest from the ribs) to 6-7 mm (nearest the ribs). It should be noted that positioning more material/thickness at the ribs increases the strength of the window well, while also reducing the amount of material between the ribs to thereby reduce the overall weight of the window well.

Although FIG. 10 illustrates the wall 1010 expanding outwards, in some embodiments the wall expands inwards. In other words, in some embodiments, the height and depth of the grooves decrease as the wall expands. Additionally, in some embodiment, the wall thickness changes more dramatically. For example, the wall thickness can vary from 1-3 mm (furthest from the ribs) to 7-8 mm (nearest the ribs).

Figures 11, 12:
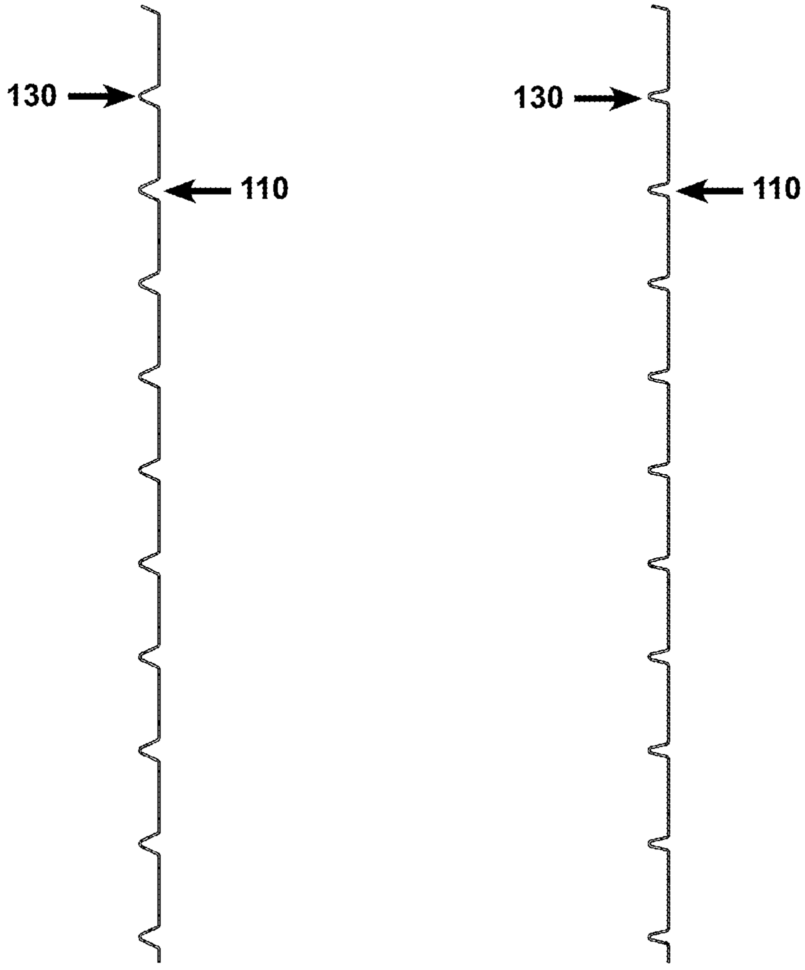
FIG. 11 illustrates a partial cross-section near the terminal end of the window well of FIG. 4.
FIG. 12 illustrates a partial cross-section of the center-most portion of the window well of FIG. 4.

In some instances, the grooves 110 vary in height and depth throughout their length and may have different dimensions as described below. In the illustrated embodiment, the grooves 110 expand from the center (i.e., the position between the two outer edges of the window well) of the groove 110 (see FIG. 12) to the terminating ends of the groove 110 (see FIG. 11, which is a cross-section near but not at a terminating end).

This configuration can increase the strength of the ribs 130 and improve the molding of the window wells. The variability in height of the grooves 110 may be greater than 1 mm, 2 mm, 3 mm, 4 mm, 5 mm, 6 mm or more than 6 mm, from a smallest height dimension to a greatest height dimension, of the variable height along a single groove 110 length. In some embodiments, the variability in depth may be greater than 1 mm, 2 mm, 3 mm, 4 mm, 5 mm, 6 mm or more than 6 mm, from a smallest depth dimension to a greatest depth dimension, of the variable depth along a single groove 110 length.

However, in some embodiments the grooves 110 maintain a constant height and depth throughout their length. In other words, the cross-section would remain the same throughout the window well's entire length.

Additionally, the varying height, depth and shape of the grooves 110 and ribs 130 improves the stacking ability of the window wells. The wall angles of the window wells also improve the stacking ability of the window wells. Therefore, the amount of window wells that can be transported on a single pallet is increased. In some embodiments, the ribs 130 of the lightweight and durable window well are manufactured with draft angles which prevent the window wells from binding together when stacked. Therefore, the draft angles of the ribs 130 facilitate the unpacking of window wells from a pallet. The increase efficiency in the packing, transporting and unpacking of the window wells can significantly reduce manufacturing and shipping costs.

In some alternative embodiments, the grooves maintain a constant height and/or depth. For instance, the fixed depth may be a depth of 1 mm, 2 mm, 3 mm, 4 mm, 5 mm, 6 mm, 7 mm or more than 7 mm. Likewise, the fixed height may be a height of 2 mm, 3 mm, 4 mm, 5 mm, 6 mm, 7 mm or more than 7 mm.

Additionally, in some embodiments, the grooves have a flared portion 210, see FIGS. 2 and 3, at the terminal ends of the grooves. More particularly, the height and the depth of the groove substantially increases at the terminal ends of the grooves (i.e., each groove expand more dramatically the last 5-10 cm of each side of the groove). In embodiments with flared portions, the variability in height of the grooves within the flared portions may be greater than 1 mm, 2 mm, 4 mm, 6 mm, 8 mm or more than 8 mm. Similarly, in embodiments with flared portions, the variability in depth of the grooves within the flared portions may be greater than 1 mm, 2 mm, 4 mm, 6 mm, 8 mm or more than 8 mm. However, in some embodiments, there are no flared portions at the end of the grooves.

In some embodiments, the flared portions have a fastening mechanism to facilitate stacking and transportation. For example, in FIGS. 2 and 3, the flared portions 210 have tabs 305 within the inner rib surface (e.g., along the groove) and slots 205 along the outer rib surface that snap into a friction fit with opposing slots/tabs positioned on the opposing rib surface of an adjacent window well. However, in some embodiments, the tabs are positioned along the outer rib surface, and the slots are positioned within the inner rib surface.

Additionally, some embodiments without flared portions also have a fastening mechanism (e.g., a protruding tab—not shown) along the grooves and/or ribs. In other embodiments, stacked window wells may be held together using a friction fit between the grooves and the ribs. Some embodiments use both a fastening mechanism and a friction fit to facilitate the stacking and transporting of window wells. Overall, the flared portions of the grooves can improve the aesthetics of the lightweight and durable window well, as well as improve the stacking ability of the window wells.

Figure 13:
FIG. 13 illustrates an exemplary acid-etched surface texturing that can be used for molds associated with the window wells of FIGS. 1 and 4.
Figure 14:
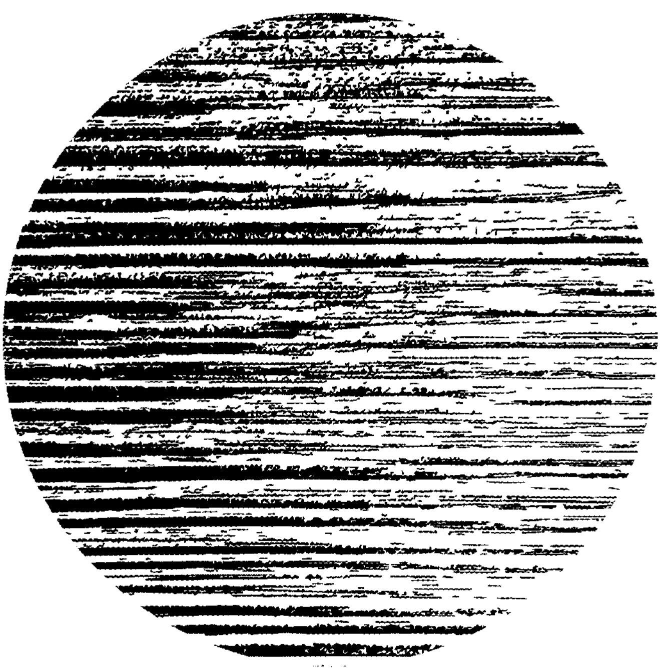
FIG. 14 illustrates an exemplary laser-etched surface texturing that can be used for molds associated with the window wells of FIGS. 1 and 4.

The aesthetics of the window well may also be improved by applying a texture or pattern to the surface of the window well. FIGS. 13 and 14 show examples of textures or patterns that can be added to the window well. More particularly, FIG. 13 illustrates an acid-etched texture with a horizontal grain, and FIG. 14 illustrates a laser-etched texture with a wave pattern.

The texture can be etched onto the surface of the mold and, thereby, into the window well when the window well is molded. The texture patterns can vary to accommodate different preference and structures (e.g., horizontal grain patterns, vertical grain patterns, wave patterns, symmetrical patterns and asymmetrical patterns).

In some embodiments, a fabric veil (not shown) is used to increase the realism of a texture or pattern. For example, the realism and natural look of a stone texture can be improved by applying a multi-colored veil onto the window well. To apply the veil to the window well, the fabric veil is inserted into the compression mold before the window well is manufactured. In other words, the fabric veil is positioned within the mold on top of the heated fiber reinforced thermoplastic sheet. However, in some embodiments, the fabric veil is positioned within the mold below the heated fiber reinforced thermoplastic sheet. Then during the molding/compression, the multi-colored pattern is embedded into the texture of the window well. The fabric veil can also be used to achieve other natural/organic looks such as wood, marble and granite textures.

This process of using a fabric veil can be particularly beneficial for blocking unsightly fibers and to provide more control over the final aesthetics that are presented as the exterior of the window well. Additionally, the texture minimizes minor blemishes that are caused by the molding/compression process. Overall, using a fabric veil can significantly add to the overall realism of the organic surface texturing caused by the mold (and/or subsequent acid etching or other finishing processes), which is typically difficult to achieve for thermoplastic materials, particularly those that are impregnated with fibers. The veil/fabric can also add additional strength and integrity to the final product. For example, the veil can increase the stiffness and durability of the window well.

It is noted that the use of veils/fabrics to provide a print through function, such as described above, have sometimes been used with thermoset plastics. But, they have not previously been used with molded thermoplastics, such as those described herein.

Manufacturing Process for the Lightweight and Durable Window Well

The lightweight and durable window well is manufactured using a two-part mold, and one or more sheets of fiber reinforced thermoplastic.

Figure 15:
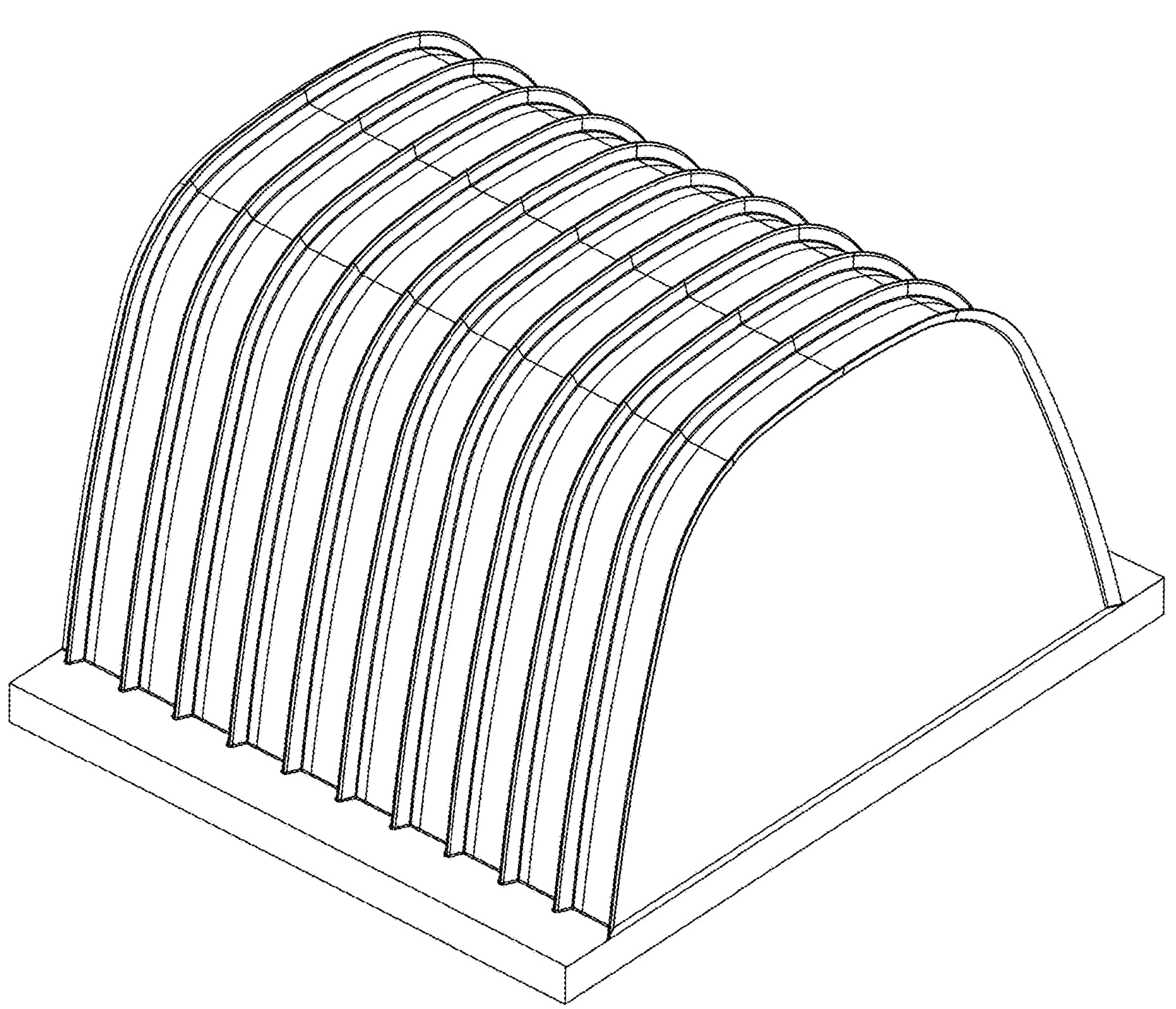
FIG. 15 illustrates a male mold used to create the window well of FIG. 4.
Figure 16:
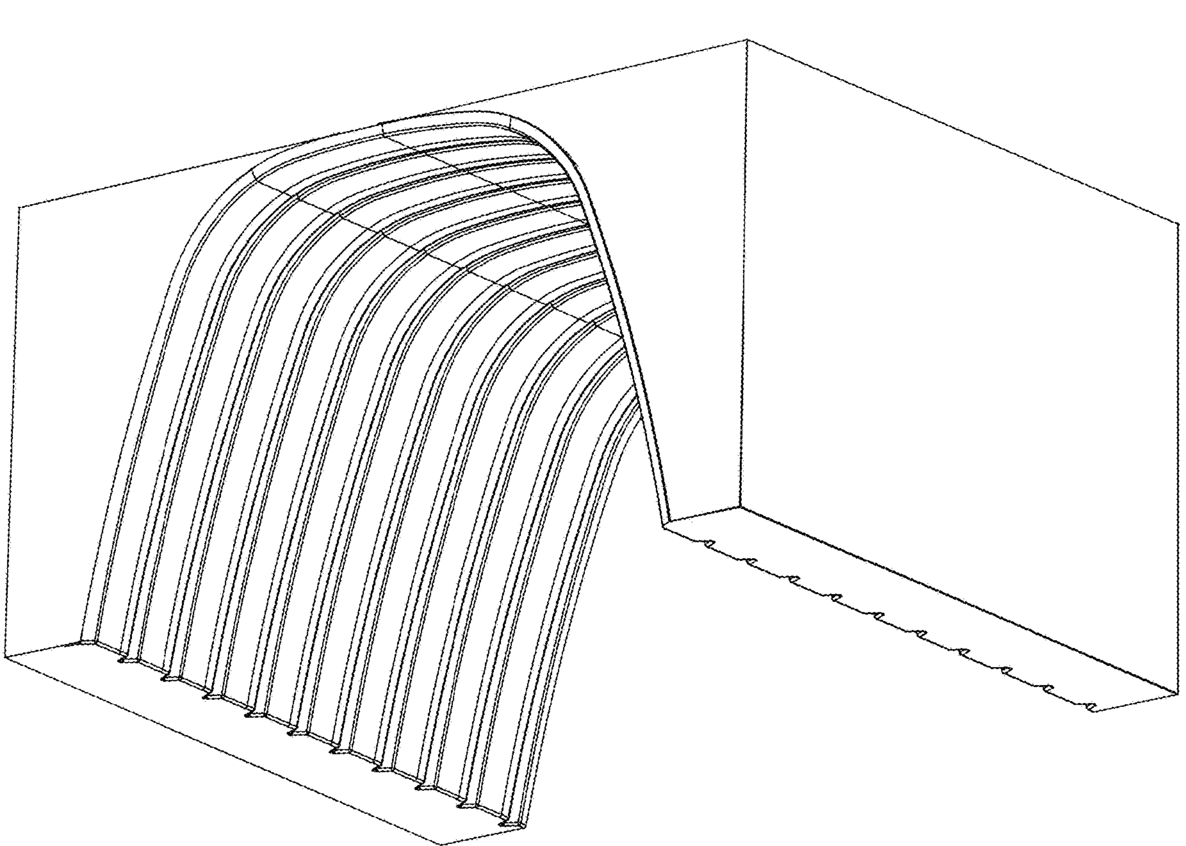
FIG. 16 illustrates a female mold used to create the window well of FIG. 4.

FIG. 15 illustrates the male mold 1500 and FIG. 16 illustrates the female mold 1600. Both illustrated molds are made of aluminum. However, some embodiments may use molds of a different material (e.g., steel, composite). Additionally, in some embodiments, the molds have guide pins (not shown, but known by those of skill in the art) to ensure that the two molds align during compression.

In some embodiments, the molds are designed so that the window well has varying wall thickness. For example, in some embodiments the wall will be thicker in the ribbed areas and thinner in the non-ribbed areas. In other words, in some embodiments, the wall is thickest at the ribs and/or the portions of the wall near the ribs. In some instances, the wall surface portions near the ribs are thicker than parts of the wall surface portions that are furthest from the ribs, such as the wall surface portions that are centrally positioned between the ribs.

It should be noted that in order to create the ribs on the window well, the mold also needs to have ribbing. Furthermore, some embodiments require additional material (i.e., additional strips of reinforced thermoplastic) to be placed at the ribs of the mold. The varying wall thickness allows the window wells to be strong while also being lightweight. The varying wall thickness also allows the molding process to be more efficient, such as by allowing the fiber reinforced plastic (and particularly the long fibers) to flow through the mold more efficiently during the molding process.

In alternative embodiments, the mold is configured with ribs and spacing that cause the molded window well to have a uniform thickness throughout the body, grooves and/or ribs. Additionally, in some embodiments, the mold is configured to make a window well with a height of 2 m, 3 m or more than 3 m. The window well can then be cut to produce two or three window wells. For example, a window well with a height of 3 m can be cut into two window wells (e.g., a 2 m window well and a 1 m window well). However, it should be noted that the steps and methods for producing the window wells are the same or similar regardless of the size of the window well.

Figure 17:
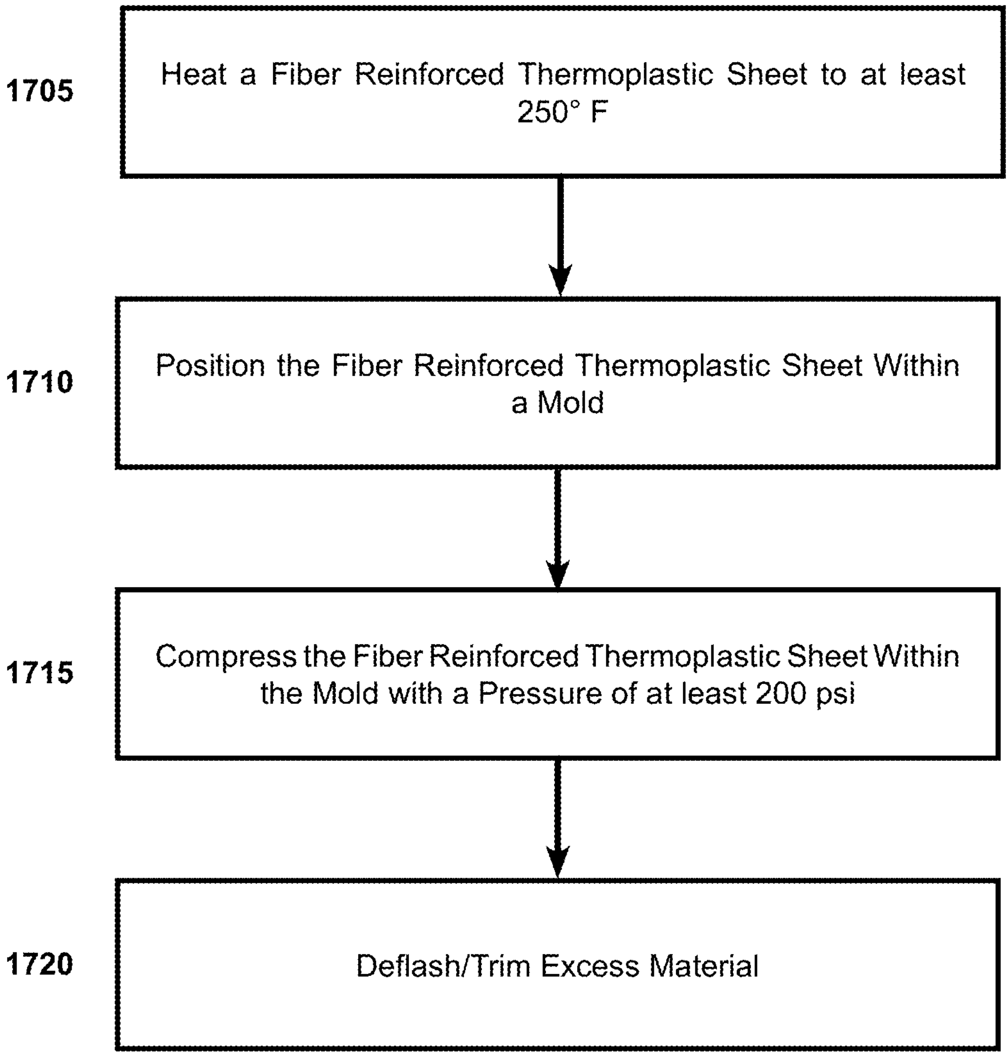
FIG. 17 illustrates a flowchart of a method for manufacturing the window wells of FIGS. 1 and 4.

FIG. 17 illustrates a flow chart of an exemplary method for producing the lightweight and durable window well. In the first step 1705, fiber reinforced thermoplastic sheets are heated to a relatively high temperature (e.g., greater than 250° F. and, in some instances, to above 300° F.). In some embodiments, the sheets of fiber reinforced thermoplastic are heated to temperatures of about 385° F. or, in some embodiments, above 385° F. prior to or during the compression.

When the sheets of reinforced thermoplastic are heated, the sheets loft up or expand from about 3.8 mm to a thickness of about 5 mm (e.g., greater than 10%, greater than 15%, greater than 20% or more than a 20% increase in sheet thickness). Using lofted sheets increases the quality of the lightweight and durable window well by allowing the thermoplastic to have increased flow once it is placed on the mold.

In the next step 1710, the heated fiber reinforced thermoplastic sheet or sheets are placed in the mold. If a fabric veil is being used, then the fabric veil is placed into the mold on top of the heated fiber reinforced thermoplastic sheet or sheets.

In some embodiments of step 1710, the fabric veil is placed into the mold before the heated thermoplastic sheet or sheets. In such embodiments, after placing the veil into the mold, the heated thermoplastic sheet is then placed into the mold on top of the veil.

Then, for both embodiments (with the veil placed over or under the thermoplastic sheet(s), the heated fiber reinforced sheet or sheets are compressed between the male mold 1500 and the female mold 1600 (step 1715).

In some embodiments, the window wells are molded and compressed with pressures ranging from 200 psi, or about 200 psi, to 900 psi, or about 900 psi, for a duration of between 30 seconds (or about 30 seconds) and up to 60 seconds (or about 60 seconds), and even more preferably within a range of between 300 psi and 800 psi for a duration of 30-60 seconds. Additionally, in some embodiments, the pressure is between 300 psi and 400 psi. In other embodiments the pressure is less than 200 psi or more than 800 psi. The duration may also be less than 30 seconds or more than 60 seconds. The compression causes the sheet or sheets of reinforced thermoplastic to take the shape of the mold.

During molding, the male mold 1500 and/or the female mold 1600 may be heated or cooled during the molding/compressing processes. In some embodiments, the molds are heated during some parts of the molding/compressing process and cooled during other parts of the process.

As discussed above, it should be noted that the window well may be formed from a single sheet of material. In other embodiments, the window well is formed, during molding, from multiple different sheets of material that are positioned adjacent each other on the mold and that are molded/compressed into each other during the molding process.

In other embodiments, the window well is formed, during molding, from multiple different sheets of material that are stacked or overlapped such that a portion of one sheet overlaps at least a portion of another sheet on the mold and that are molded/compressed into each other during the molding process. In other words, some embodiments require the user to place multiple heated sheets of fiber reinforced thermoplastic within the mold. This may be beneficial, for example, when a single sheet is not large enough to cover an entire mold and/or for facilitating the apportionment of additional material to the rib sections, by positioning/layering strips of additional material where the ribs are formed, such that that ribs are composed of stacked layers (2 or more) of thermoplastic material.

In some embodiments, the window well is also deflashed/trimmed after compression to remove any excess material (see Step 1720). However, in some embodiments the part may be molded to near net shape on all sides. Additionally, in some embodiments, the window well coloring is controlled by color pigments added to the plastic/fibers used in the reinforced thermoplastic. However, in some embodiments, the window well is painted after molding.

Modular Insert

Figure 18:
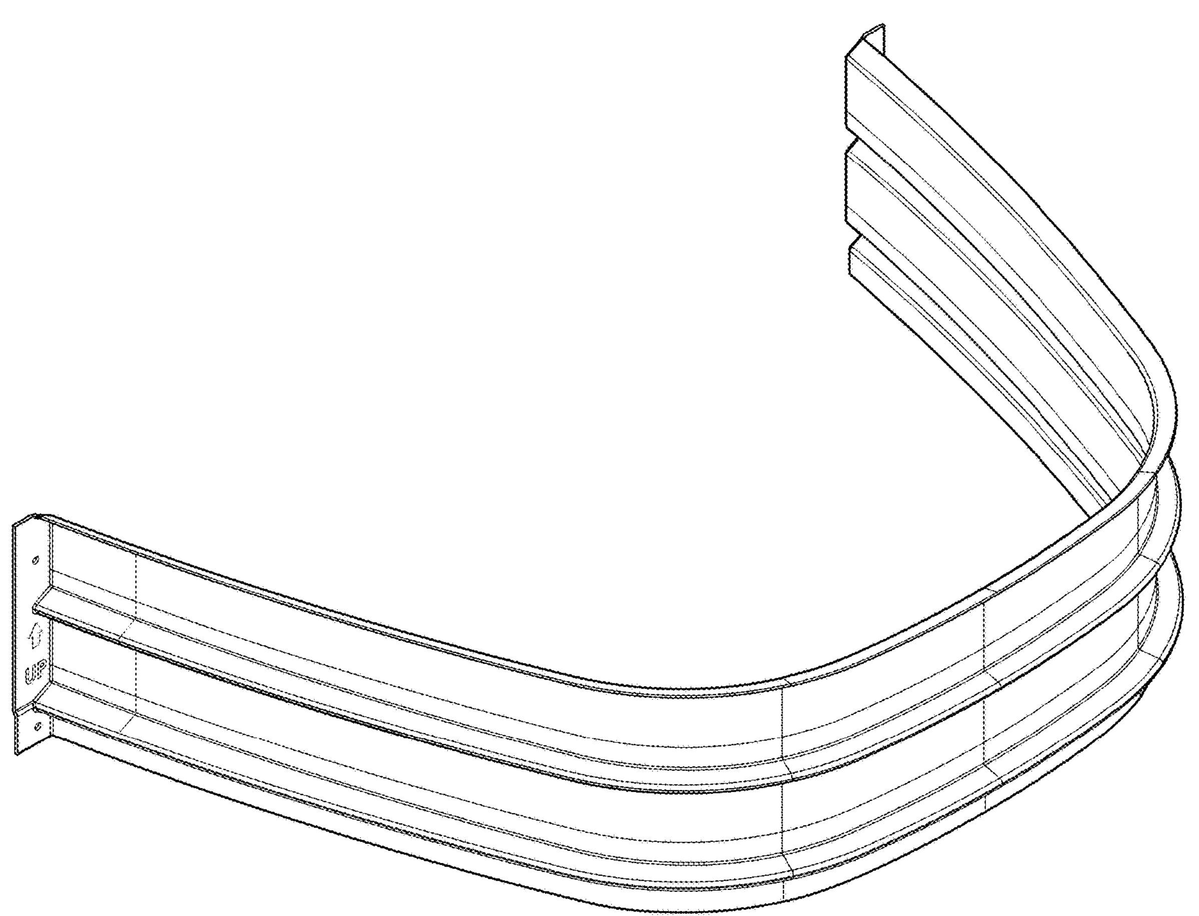
FIG. 18 illustrates a perspective view of an exemplary modular insert.

In some embodiments, a modular insert can be used to increase the height of the lightweight and durable window well. FIG. 18 illustrates a perspective view of a modular insert 1800. The modular insert 1800 has the same general shape and design of the main window well, but with fewer rib/wall surface portions. In the present embodiment, for example, the modular insert includes two ribs and two wall surface portions. However, the modular insert may have more ribs and wall sections too, in other embodiments.

Additionally, the height of the modular insert may vary to accommodate different needs and preferences, from 25 cm, 50 cm, 75 cm, 100 cm or more than 100 cm. Furthermore, in some embodiments, multiple modular inserts can be stacked on top of each other to further increase the height of the resulting window well that includes one or more modular inserts in combination with the window well described above. Therefore, a consumer can attach one or more modular inserts 1800 in order to modify their window well to a desired height.

Figure 19:
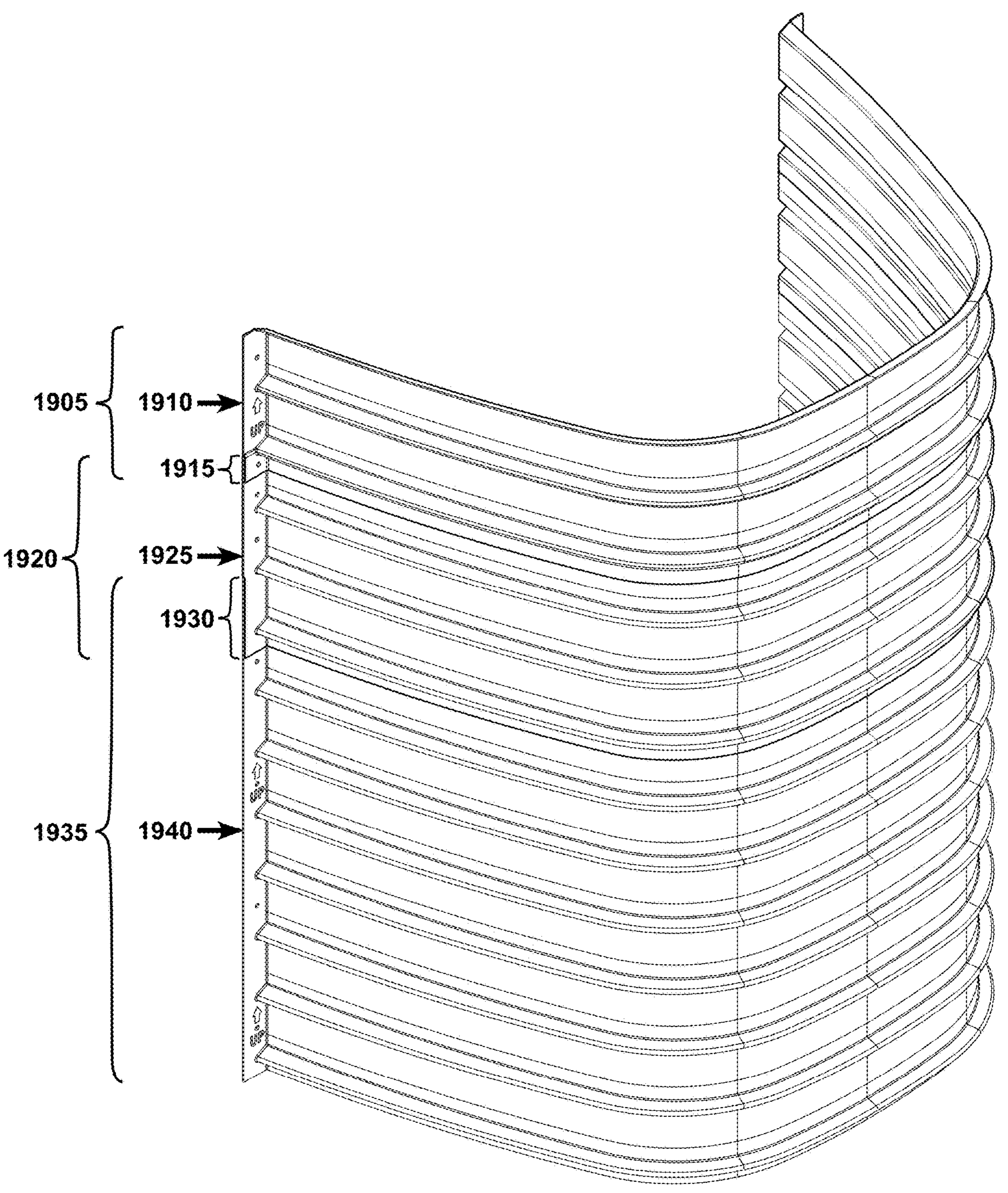
FIG. 19 illustrates a perspective view of the back of the window well of FIG. 4 with two modular inserts attached to the top of the window well.

FIG. 19 illustrates an example of a window well 1940 configured with two attached modular inserts, 1910 and 1925, positioned in attachment with the window well 1940. More particularly, the bottom of the modular insert 1910 is attached to the top of the modular insert 1925. Similarly, the bottom of the modular insert 1925 is attached to the top of the window well 1940. It should be noted that a modular insert may also be attached to the bottom of the window well 1940.

Additionally, the height of the window well 1940 is reflected by the bracket 1935. Similarly, the height of the modular insert 1925 is reflected by the bracket 1920, and the height of the modular insert 1910 is reflected by the bracket 1905. It should be noted that the window well 1940 and the modular insert 1925 overlap by the amount indicated by bracket 1930. Similarly, the middle modular insert 1925 and the top modular insert 1910 overlap by the amount indicated by bracket 1915.

Although not required, in some embodiments, the attachment holes (e.g., 125 of FIG. 1) in the flanges (e.g., 120 of FIG. 1), line up with each of the modular inserts and/or the window well, when they are nested/placed together in the configuration shown, so as to further facilitate their installation in an aligned and correct fashion.

The amount of overlap between a window well and a modular insert may vary to accommodate different needs and preferences, from 3 cm, 5 cm, 10 cm, 20 cm, 30 cm or more than 30 cm. Similarly, the amount of overlap between one modular insert and a different modular insert may vary to accommodate different needs and preferences, from 3 cm, 5 cm, 10 cm, 20 cm, 30 cm or more than 30 cm.

For example, in FIG. 19, the bottom portion of the bottom groove of the modular insert 1910 overlaps with the top ridge of the modular insert 1925. In other words, the modular inserts, 1910 and 1925, have about 4 cm of overlap (see bracket 1915). Similarly, the second to bottom groove of the modular insert 1925 overlaps with the top ridge of the window well 1940. However, unlike the modular inserts 1910 and 1925, the bottom groove of the modular insert 1925 also overlaps with the top groove of the window well 1940. In other words, the modular insert 1925 and the window well 1940 have about 12 cm of overlap (see bracket 1930). Additionally, in some embodiments, a modular insert and a window well have two or more grooves that overlap. Similarly, in some embodiments, a modular insert and a different modular insert have two or more grooves that overlap.

In some embodiments, a modular insert attaches onto the top half of the window well using a fastener. For example, the modular insert may use a snapping mechanism (not shown) to fasten to the back of the main window well. Additionally, some embodiments may use a friction fit to fasten the modular insert to the window well. In other embodiments, the modular insert will have attachment holes which line up with the main window well's attachment holes. Therefore, a bolt or screw can be used to fasten both the main window well and the modular insert to the structure. It should be noted that in some embodiments, a mixture of fastening methods is used (e.g., a snapping mechanism and a friction fit).

Additionally, in some embodiments the modular insert can be attached to a window well while the window well remains attached to a structure. Similarly, the modular insert can be replaced without detaching the main window well from its corresponding structure. Therefore, the modular insert allows for easy and efficient repairs if the modular insert or the main window well is damaged. For example, a damaged section of the window well may be cut off and replaced with a modular insert.

Overall, the disclosed embodiments are directed to a lightweight and durable window well that has a variety of improvements over traditional window wells.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of manufacturing a window well, the method comprising:

heating a fiber reinforced thermoplastic sheet to more than 250° F.;

positioning the fiber reinforced thermoplastic sheet, after the heating, within a mold; and compressing the fiber reinforced thermoplastic sheet within the mold with a pressure of greater than 200 psi, wherein the manufactured window well is composed of a plurality of fibers forming a fiber reinforced thermoplastic forming a body having a plurality of ribs, wherein at least one of said ribs has a variable vertical height wherein the variable vertical height is parallel to a major face of the body, wherein at least some fibers within the long fiber reinforced thermoplastic are omnidirectional, relative to other fibers in the thermoplastic, wherein the variable vertical height of the at least one rib having a variable vertical height includes a smaller height in a center of the body and a greater height at ends of the body when the window well is in an installed orientation.

2. The method of claim 1, wherein the method further comprises heating the fiber reinforced thermoplastic sheet to more than 385° F. prior to or during the compressing.

3. The method of claim 1, wherein the method comprises compressing the fiber reinforced thermoplastic sheet within the mold with a pressure within a range from about 400 psi to about 800 psi.

4. The method of claim 1, wherein the method comprises compressing the fiber reinforced thermoplastic sheet within the mold with a pressure within a range from about 300 psi to about 400 psi.

5. The method of claim 1, wherein the fiber reinforced thermoplastic sheet comprises polypropylene.

6. The method of claim 1, wherein multiple heated sheets of fiber reinforced thermoplastic are positioned and compressed within the mold simultaneously.

7. The method of claim 1, wherein the mold has ribbing and wherein additional material is placed at the ribbing of the mold.

8. The method of claim 1, wherein a fabric veil is positioned within the mold on top of the heated fiber reinforced thermoplastic sheet.

9. The method of claim 1, wherein the mold produces a window well with a varying wall thickness.

10. The method of claim 1, wherein said at least some fibers within the fiber reinforced thermoplastic have a length of greater than 6 mm.

11. The method of claim 1, wherein said at least some fibers within the fiber reinforced thermoplastic have a length of greater than 10 mm.

12. The method of claim 1, wherein said at least some fibers within the fiber reinforced thermoplastic have a length of greater than 12.5 mm.

13. A method of manufacturing a window well, the method comprising:

heating a fiber reinforced thermoplastic sheet to more than 250° F.;

positioning, after heating, the fiber reinforced thermoplastic sheet within a mold having rib-forming features; and compressing the heated fiber reinforced thermoplastic sheet within the mold at a pressure of greater than 200 psi to form a body of the window well having a plurality of ribs, wherein at least one of the plurality of ribs formed by the mold has a height that varies along a length of the rib, the height being smaller at a central region of the body and greater at opposing end regions of the body.

14. The method of claim 13, wherein at least one of the plurality of ribs includes a flared portion at a terminal end of the rib, the flared portion having a height and depth that increase relative to an intermediate portion of the rib.

15. A method of manufacturing a window well, the method comprising:

providing a sheet of fiber reinforced thermoplastic comprising fibers having a length greater than 6 mm, wherein at least some of the fibers are oriented in multiple non-parallel directions relative to other fibers within the sheet;

heating the sheet to a temperature greater than 250° F., such that the sheet increases in thickness by at least 10% relative to an initial thickness prior to heating;

positioning the heated sheet within a mold having rib-forming features; and compressing the heated sheet within the mold at a pressure of greater than 200 psi to form a body of the window well having a plurality of ribs.

* * * * *